(12) United States Patent
Seng et al.

(10) Patent No.: US 6,940,671 B2
(45) Date of Patent: Sep. 6, 2005

(54) SYSTEM AND METHOD TO DETERMINE THE TIME DOMAIN EQUALIZED SIGNAL-TO-NOISE RATIO OF A MASS STORAGE DEVICE

(75) Inventors: Edmun ChianSong Seng, Singapore (SG); AikChuan Lim, Singapore (SG); Kay Hee Tang, Singapore (SG); UttHeng Kan, Singapore (SG); Jeffrey Soon Beng Sim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 238 days.

(21) Appl. No.: 09/963,879

(22) Filed: Sep. 26, 2001

(65) Prior Publication Data

US 2002/0128787 A1 Sep. 12, 2002

Related U.S. Application Data

(60) Provisional application No. 60/745,445, filed on Nov. 2, 2000, and provisional application No. 60/235,604, filed on Sep. 27, 2000.

(51) Int. Cl.$^7$ .............................................. G11B 27/36
(52) U.S. Cl. ........................................... 360/31; 702/69
(58) Field of Search .............. 360/25, 31; 324/613–614, 324/211, 213; 708/319, 323; 702/58, 69, 72, 82, 190–91

(56) References Cited

U.S. PATENT DOCUMENTS

| | | | | |
|---|---|---|---|---|
| 5,721,816 A | * | 2/1998 | Kusbel et al. | ................. 714/15 |
| 5,754,353 A | * | 5/1998 | Behrens et al. | ................ 360/53 |
| 6,185,175 B1 | * | 2/2001 | Zook | ........................ 369/53.35 |
| 6,236,628 B1 | * | 5/2001 | Kim | ......................... 369/44.41 |
| 6,687,205 B1 | * | 2/2004 | Huber | ...................... 369/47.19 |

* cited by examiner

*Primary Examiner*—Marc S. Hoff
*Assistant Examiner*—Paul Kim
(74) *Attorney, Agent, or Firm*—Kirk A. Cesari (57) ABSTRACT

Systems and methods are provided through which a time domain equalized signal-to-noise-ratio (ESNR) of an electronic device is determined by executing ESNR determining firmware in the electronic device. The ESNR is used to perform rejection/acceptance testing of the electronic device during manufacturing of the device, and/or to perform read channel tuning and optimization. In one embodiment, determination of the ESNR includes both phase level retry and global level retry.

13 Claims, 12 Drawing Sheets

SYSTEM AND METHOD TO DETERMINE THE TIME DOMAIN EQUALIZED SIGNAL-TO-NOISE RATIO OF A MASS STORAGE DEVICE

RELATED APPLICATION

This application claims the benefit of U.S. Provisional Application Ser. No. 60/235,604 filed Sep. 27, 2000 under 35 U.S.C. 119(e).

This application claims the benefit of U.S. Provisional Application Ser. No. 60/745,445 filed Nov. 2, 2000 under 35 U.S.C. 119(e).

This application is related to copending U.S. application Ser. No. 09/964,302, filed Sep. 27, 2001 entitled "METHOD AND APPARATUS FOR DETERMINING EQUALIZED SIGNAL-TO-NOISE RATIO IN A STORAGE DEVICE."

FIELD OF THE INVENTION

This invention relates generally to mass storage performance testing and tuning, and more particularly to determining the time domain equalized signal-to-noise ratio of a mass storage device.

BACKGROUND OF THE INVENTION

Mass storage devices are tested during production to determine the quality and/or reliability of the device. The testing is also called a certification process. To test the device, certification firmware is downloaded to a read-only-memory (ROM) of the mass storage device and executed. The certification firmware includes a number of certification tests. During the certification process, the certification tests are executed on a mass storage device in a predetermined sequence of the tests until the entire sequence of certification tests is completed or halted. The sequence of certification tests will halt when the any one of the tests in the sequence fails. The certification tests are then downloaded with customer firmware in preparation to be shipped to a customer.

One of the certification tests is a test of the bit error rate (BER) of the mass storage device. The BER is an indication the quality and/or reliability of the device during testing for acceptance or failure rejection. The BER is also used for tuning a read channel of the mass storage device. However, BER determination is a slow process that increases the cost of testing and tuning a mass storage device.

In another conventional solution to testing and tuning a mass storage device, the time domain equalized signal-to-noise ratio (ESNR) is determined. The ESNR is determined by computer-readable logic that is implemented outside of the mass storage device. The ESNR test logic is not stored on, or downloaded to memory of the mass storage device. In one example, the logic is implemented in software on a computer that is operably coupled to the mass storage device through a communication channel or link. The logic is executed after retrieving the respective data from the mass storage device. However, the communication channel or link between the device that implements the ESNR logic and the mass storage device is slow. The slow link has the effect of greatly increasing the time to transfer mass storage data that is input to the ESNR logic.

Furthermore, conventional methods of determining ESNR include phase level retry or global level retry. Phase level retrying includes subsequent attempts to verify or and/or qualify one or more read phases of data that previously failed to verify or and/or qualify. Global level retrying includes subsequent attempts to read the one or more phrases of data after the phases are determined to have an unacceptable ESNR. The mutually exclusive use of phase level retry and global level retry reduces the accuracy of the determined ESNR value.

What is needed is a system, method and/or apparatus improves the speed of determining the ESNR value of a mass storage device. A system, method and/or apparatus that improves the accuracy of the determined ESNR value is also needed.

SUMMARY OF THE INVENTION

The above-mentioned shortcomings, disadvantages and problems are addressed by the present invention, which will be understood by reading and studying the following specification.

Systems and methods are provided through which a time domain equalized signal-to-noise-ratio (ESNR) of an electronic device is determined by executing ESNR determining firmware in the electronic device. The ESNR is used during manufacturing to determine whether the electronic device is rejected or accepted for delivery to a customer. The ESNR is also used during manufacturing to perform read channel tuning and optimization.

In another embodiment of the present invention, a method to determine ESNR includes retrying verification of data at the phase level and retrying a time domain equalized signal-to-noise ratio at the global level. In some embodiments, before the phase level retry and the global level retry, the method also includes filling a write buffer of the mass storage device with data, the data having a pseudo-random pattern, and later writing the write buffer to the media of the mass storage device. In some embodiments, the mass storage device includes a disc drive. In some embodiments, the method also includes setting a read channel to output sampled analog-to-digital converted data to a non-return-to-zero (NRZ) bus of the mass storage device. In some embodiments, the method includes obtaining all phases of data stored on the media, before the phase level retry and the global level retry. In one example, the obtaining is reading data, yielding read data. In some embodiments, method also includes calculating a result. In some embodiments, the method also includes determining that the mass storage device passed or failed. One embodiment of phase level retrying includes verifying all phases of the read data, determining the qualification of all phases of the read data, and determining the exhaustion of phase level retry. One embodiment of global level retrying includes comparing the time domain equalized signal-to-noise ratio to a predetermined threshold, and determining the exhaustion of global level retry.

In yet another embodiment of the present invention, a method of quality assurance testing of a mass storage device includes downloading ESNR testing firmware to a memory of the device and, determining an ESNR value of a recording medium of the mass storage device, rejecting or accepting the test device is performed, from the ESNR value.

In another embodiment of the present invention, an apparatus for manufacturing quality assurance pass/fail testing of an electronic device includes a microcontroller or microprocessor having firmware. The firmware has a determiner of a time domain equalized signal-to-noise ratio. The firmware is operably coupled to a storage medium of the electronic device that is the subject of the testing. A determiner of a time domain equalized signal-to-noise ratio includes a phase level retrier, an ESNR determiner, and a global level retrier. A phase level retrier includes a read data phase verifier, a qualification determiner, and a phase level completion determiner. A global level retrier includes an ESNR threshold comparator, a global level completion determiner.

Advantageously, the systems and methods described provide a more accurate measurement of disc drive quality, and less time than conventional systems.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of the preferred embodiments, reference is made to the accompanying drawings that form a part hereof, and in which are shown by way of illustrating specific embodiments in which the invention may be practiced. It is to be understood that other embodiments may be utilized and structural changes may be made without departing from the scope of the present invention.

The invention described in this application is useful for all types of disc drives, including hard-disc drives, optical drives (such as CDROMs), ZIP drives, floppy-disc drives, and any other type of drive.

The detailed description is divided into four sections. In the first section, a system level overview of the invention is presented. In the second section, methods for an embodiment of the invention are provided. In the third section, apparatus of the invention is described. Finally, in the fourth section, a conclusion of the detailed description is provided.

System Level Overview

Figure 1:
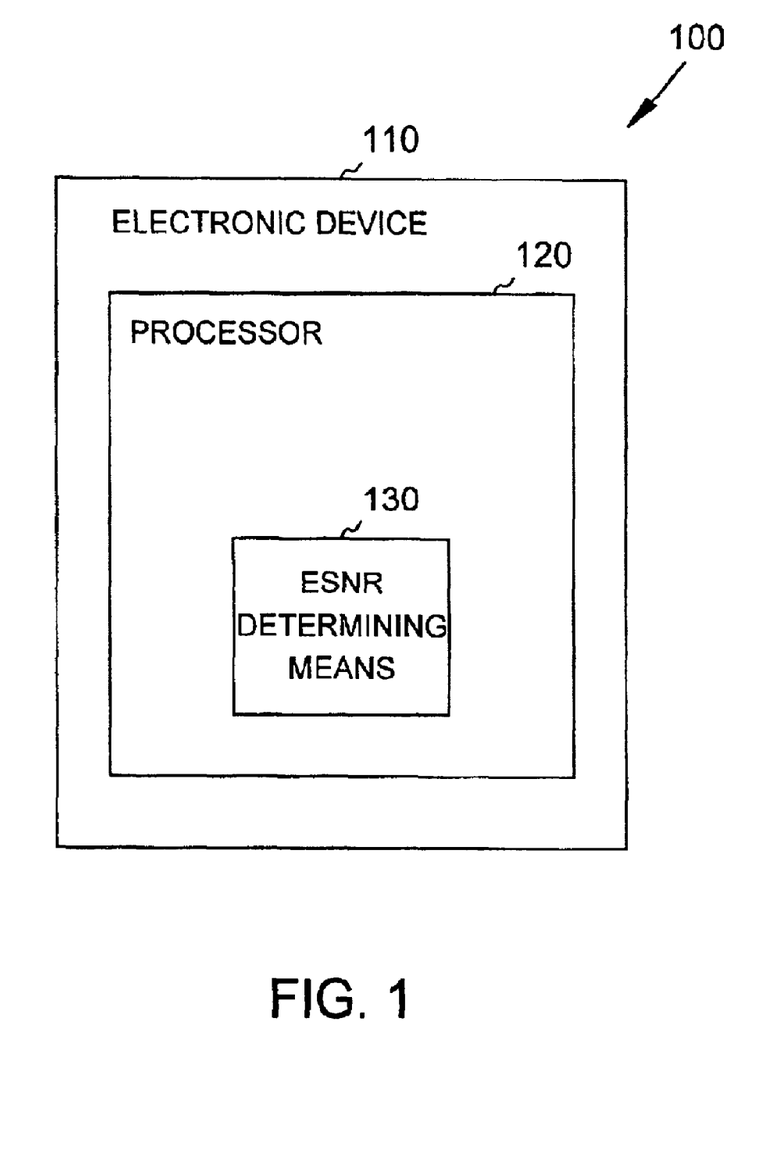
FIG. 1 is a block diagram that provides a system level overview of the operation of embodiments of the present invention.

FIG. 1 is a block diagram that provides a system level overview 100 of the operation of embodiments of the present invention. Embodiments of the invention operate in a multi-processing, multi-threaded operating environment on a computer, such as information handling system 1300 in FIG. 13.

System 100 includes an electronic device 110 that determines a time domain equalized signal-to-noise-ratio (ESNR) of a storage medium of the electronic device (not shown). System 100 includes a processor 120. Processor 120 is also known as a disc controller 1214 in FIG. 12 or a microcontroller. The processor 120 is operably coupled to the storage medium (not shown) of the electronic device 100. Processor 120 includes a means 130 operative on the processor 120 to determine the ESNR of the recording medium. The present invention provides the ESNR determining means 130 in an electronic device 110 that is stored in the electronic device 110.

System 100 eliminates the need of an ESNR determining means on another electronic device. Storing the ESNR determining means 130 in the electronic device 110 improves the speed of the determination of the ESNR.

In another aspect of the present invention, the ESNR determining means 130 performs both phase level retry and global level retry in order to improve the accuracy of the determined ESNR value. Phase level retrying includes subsequent attempts to verify or and/or qualify one or more read phases of data that previously failed to verify or and/or qualify. Global level retrying includes subsequent attempts to read the one or more phrases of data after the phases are determined to have an unacceptable ESNR.

Figure 11:
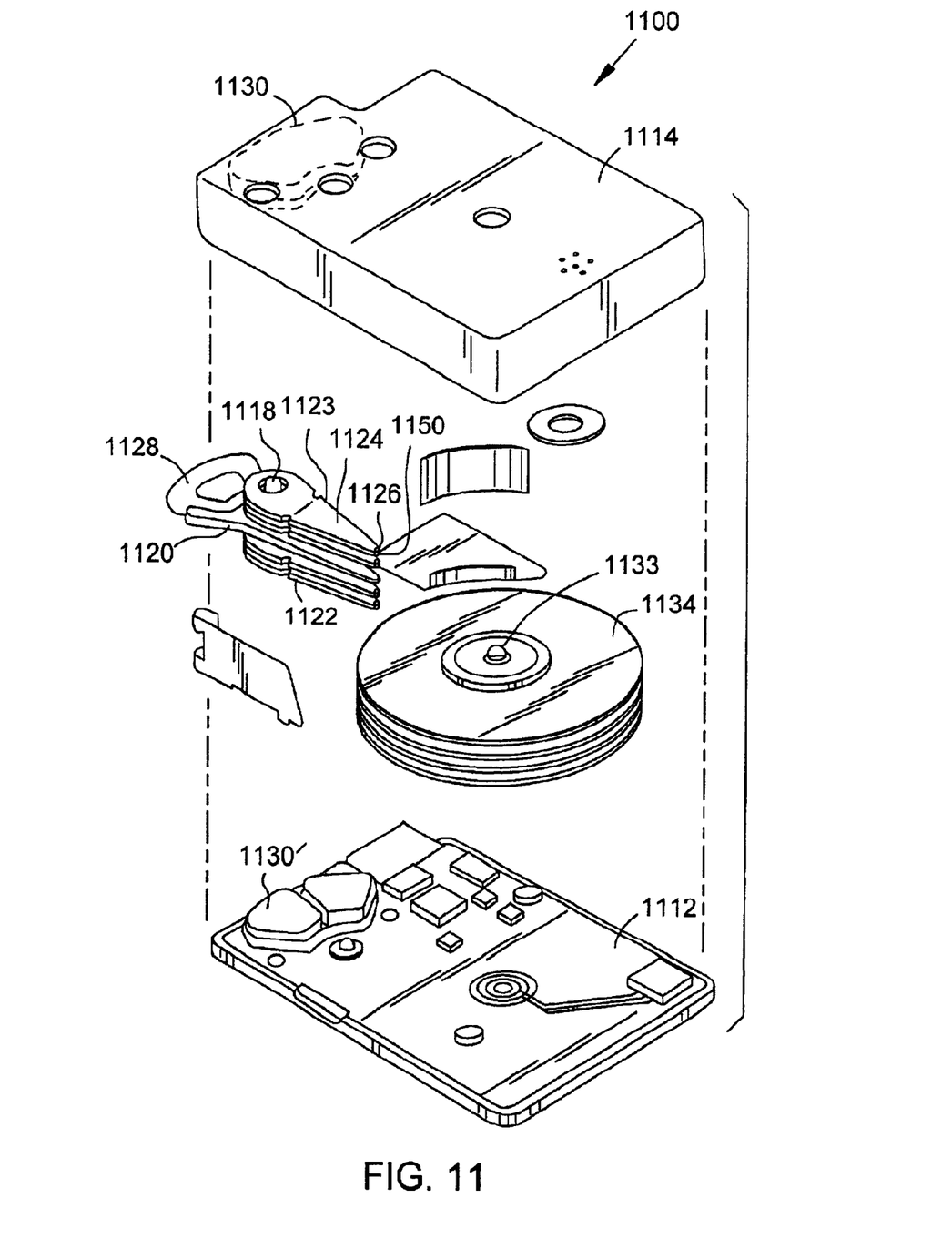
FIG. 11 is an exploded view of one embodiment of a disc drive of the present invention.

One example of the electronic device 110 is a mass storage device. A further example of a mass storage device is a disc drive in which the recording medium is the disc, such as magnetic disc drive 1100 and disc assembly 1132 below.

System 100 implements the ESNR determining means 130 on an electronic device 110, which provides the speed of ESNR determining of the electronic device 110. System 100 also performs both phase and global level retries in determining the ESNR, which provides the advantage of improving the accuracy of the ESNR value.

Description of the Preferred Embodiment

Figure 2:
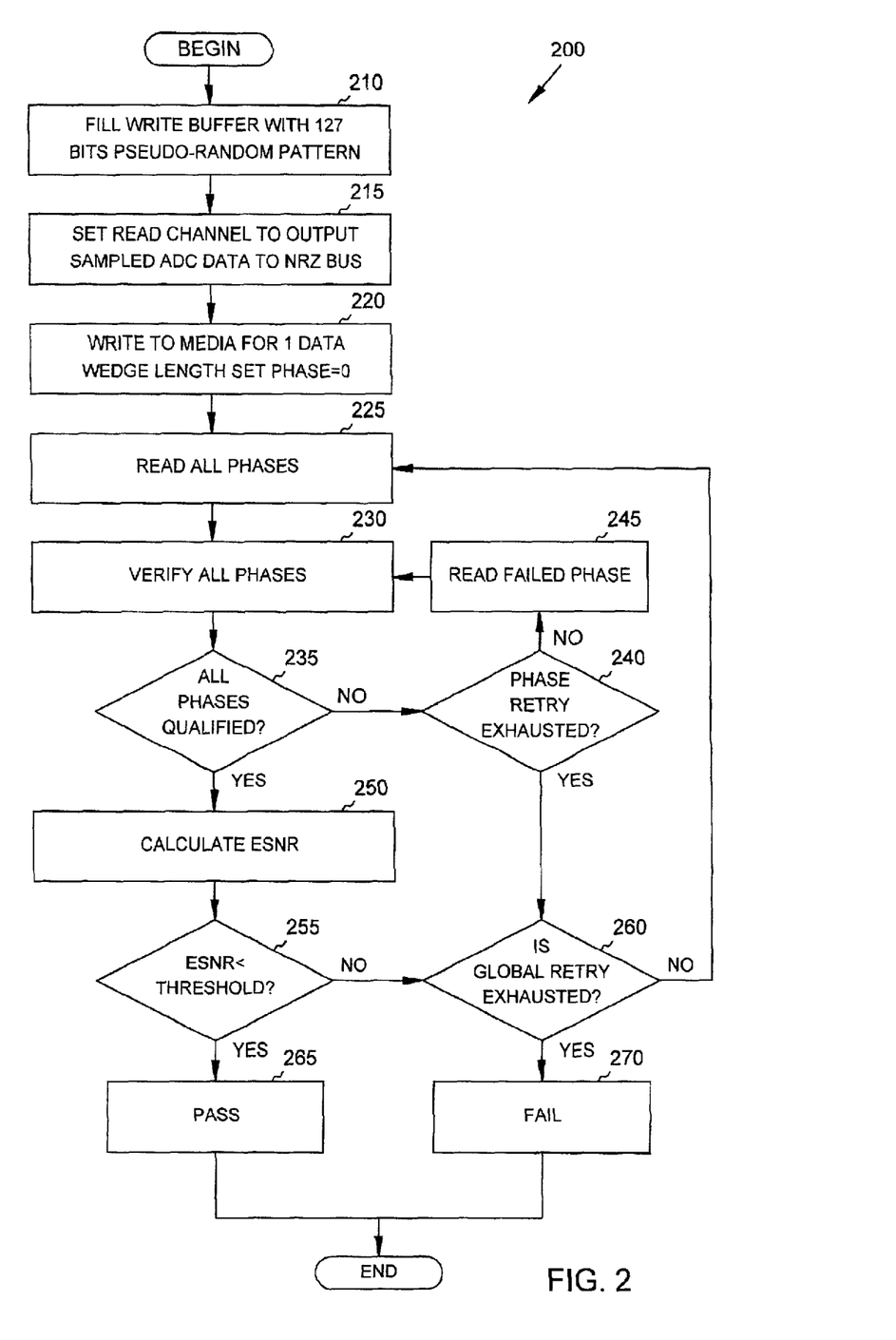
FIG. 2 is a flowchart of a method to determine the time domain equalized signal-to-noise ratio of a mass storage device, according to an embodiment of the invention.

FIG. 2 is a flowchart of a method 200 to determine the time domain equalized signal-to-noise ratio of a mass storage device, according to an embodiment of the invention.

In method 200, a write buffer is filled with a pseudo random bit pattern in block 210. The pseudo random bit pattern is also known as a pseudo random binary sequence (PRBS or PRS). In one embodiment, pseudo-random patterns are apparently random, but in fact are pre-determined or deterministic, such as through the generation of random numbers on conventional computer systems in which the same sequence of random numbers are generated each time a random-number generator is initialized and used.

Conventionally, the random-number generator is initialized with a "key" number, with which the random-number generator will thereafter generate the same sequence of numbers every time a particular key is used. In varying embodiments, the length of the bit pattern is 31 or 127 bits. A read channel of a mass storage device is set or configured to output sampled data from an analog-to-digital (ADC) data to a non-return-to-zero (NRZ) bus in block 215.

Thereafter, the write buffer is written from one data wedge to the recording media of the mass storage device in block 220. A data wedge is a data area within two servo sectors. Servo sectors are interleaved with data sectors. In some embodiments, a data wedge includes two data sectors that are 512 bytes long. In some embodiments, a data wedge is written continuously over the data wedge, in a mode called super sector write, which yields a super sector. A super sector is longer than a 512-byte sector. In some embodiments, the writing includes seeking to a target track of the mass storage device. In some other embodiments, the write phase is set to zero.

Subsequently, a plurality of phases of data on the mass storage device are read in block 225. In some embodiments, the plurality of phases are read, phase-by-phase, by setting the read channel chip. In some embodiments, eight phases are read.

Data that has been written to a storage medium is read from the medium through a read channel. Specifically, a read signal is generated by a read head that passes over the medium. The data is read in phases. The read signal is provided to the read channel where it is equalized to have a desired shape and is sampled by an analog-to-digital converter. The digital samples are then provided to a detector, such as a Viterbi detector, which determines a most likely sequence of values that could be represented by the digital samples.

Thereafter, each of the plurality of phases the read data is checked and/or verified in block 230. In some embodiments, eight phases are verified.

Thereafter, a determination as to whether all phases are qualified in block 235. In some embodiments, qualification is determined in block 235 by checking the first reading of all of the phases, such as all eight phases, against a predetermined range based on a predetermined signal level respectively. If the reading falls within the range, means that particular phase is qualified.

If the qualification in block 235 fails, then a determination is made as to whether the number of phase level retries has been exhausted in block 240. In some embodiments, ten retries is performed for each phase. If the number of retries has not been exhausted, then a flag or indication of a failed read phase is set in block 245, and the method continues by verifying all phases in block 230. If the number of retries has been exhausted, then the method continues with determining in block 260 if global retries has been exhausted. The actions of verifying all phases in block 230, qualifying all phases in block 235, determining exhaustion of retries in block 240, and indicating that the read phase failed in block 245 are sometimes referred to generally as phase level retry.

Phase level retry is needed to obtain a correct phase samples for each of the phases of the read data from the read channel analog to digital converter (ADC). Although the phases are selectable in some embodiments, presence of noise in the signal may cause a read channel phase lock loop (PLL) to lock on to an incorrect phase, thereby causing the rest of the data obtained for the phase to be incorrect.

If qualification in block 235 succeeds, then the time domain equalized signal-to-noise ratio is calculated from the read data in block 250. In some embodiments, using a pseudo random binary sequence (PRBS or PRS) that contains M repeating cycles of a bit pattern having N bits, the following calculations are performed:

Assuming $$V = \sum_{m=1}^{M} \sum_{n=1}^{N} a_{mn}$$

and $$\epsilon_{mn} = a_{mn} - \overline{a_{mn}},$$

where
$\epsilon_{mn}$=sampling error;
$a_{mn}$=ADC sample output; and
$\overline{a_{mn}}$=Ideal Target Sample
Then $$\sigma_{MSE}^2 = \frac{1}{MN}\sum_{m=1}^{M}\sum_{n=1}^{N}\left[\epsilon_{mn}^2 - \left(\frac{1}{MN}\sum_{m=1}^{M}\sum_{n=1}^{N}\epsilon_{mn}\right)^2\right]$$

where
M=the m-th cycle of the PRS; and
N=the n-th bit of the PRS
Breaking down into noise and NLD:

$$\sigma_{MSE}^2 = \sigma_{Noise}^2 + \sigma_{NLD}^2,$$

with $\sigma_{Noise}^2 = \frac{1}{N}\sum_{n=1}^{N}\left(\frac{1}{M}\sum_{m=1}^{M}\epsilon_{mn}^2 - \left(\frac{1}{M}\sum_{m=1}^{M}\epsilon_{mn}\right)^2\right),$ $$\sigma_{NLD}^2 = \frac{1}{N}\sum_{n=1}^{N}\left(\frac{1}{M}\sum_{m=1}^{M}\epsilon_{mn}\right)^2 - \left(\frac{1}{N}\sum_{n=1}^{N}\left(\frac{1}{M}\sum_{m=1}^{M}\epsilon_{mn}\right)\right)^2$$

The equalized signal-to-noise ratio (ESNR) is then calculated as:

$$ESNR = 20*\log\frac{S_{EPR4sample}}{Noise_{PRSrms}}$$
$$= 20*\log\frac{S_{PRSrms}}{Noise_{PRSrms}} + 10*\log\frac{N}{N+1}$$

$$\frac{S_{EPR4sample}}{S_{PRSrms}} = \sqrt{\frac{N}{N+1}}, \text{ where } N = PRS \text{ Length}$$

$$S_{PRSrms} = SignalEPR4$$

$$ESNR_{rmse} = 20*\log\left(\frac{SignalEPR4^2}{\sigma_{MSE}^2}\right)$$

$$ESNR_{noise} = 20*\log\left(\frac{SignalEPR4^2}{\sigma_{Noise}^2}\right)$$

$$ESTDR = 20*\log\left(\frac{SignalEPR4^2}{\sigma_{NLD}^2}\right)$$

where ESTDR=Equalized Signal to Distortion Ratio. The exact formulas used to calculate the ESNR are not critical to the present invention; in some other embodiments, other formulas that are well-known to those of ordinary skill in the art are used to calculate the ESNR.

After calculation of the ESNR in block 250, the calculated ESNR value is compared to a predetermined threshold in block 255. If the ESNR is less than the determined threshold, then a flag or indication that the mass storage device has passed or succeeded is made in block 265, and the method ends. If the ESNR is greater than or equal to the determined threshold, then the method 200 continues with determining 260 if global retries has been exhausted. On some embodiments, the number of retries performed is five. If the global retries have not been exhausted, then method 200 continues with reading all phases in block 225. However, if global retry has been exhausted, a flag or indication that the mass storage device has failed is made in block 270, and the method ends. The action of comparing the ESNR to a predetermined threshold in block 255, and determining if the number of global reties is exhausted in block 260, is generally referred to as performing global retry.

In global retry, the presence of unpredictable burst noise may at times prompt a read channel phase-lock loop (PLL) to lose lock of the timing loop, thereby causing a segment of the read data to be incorrect. An incorrectly read segment causes the final ESNR value to be less than zero. When the ESNR value exceeds the predetermined threshold, a global level retry is indicated to redo all the reading of all phases.

The actions of the phase level retry and the global level retry improves the accuracy of the determination of ESNR.

Figure 3:
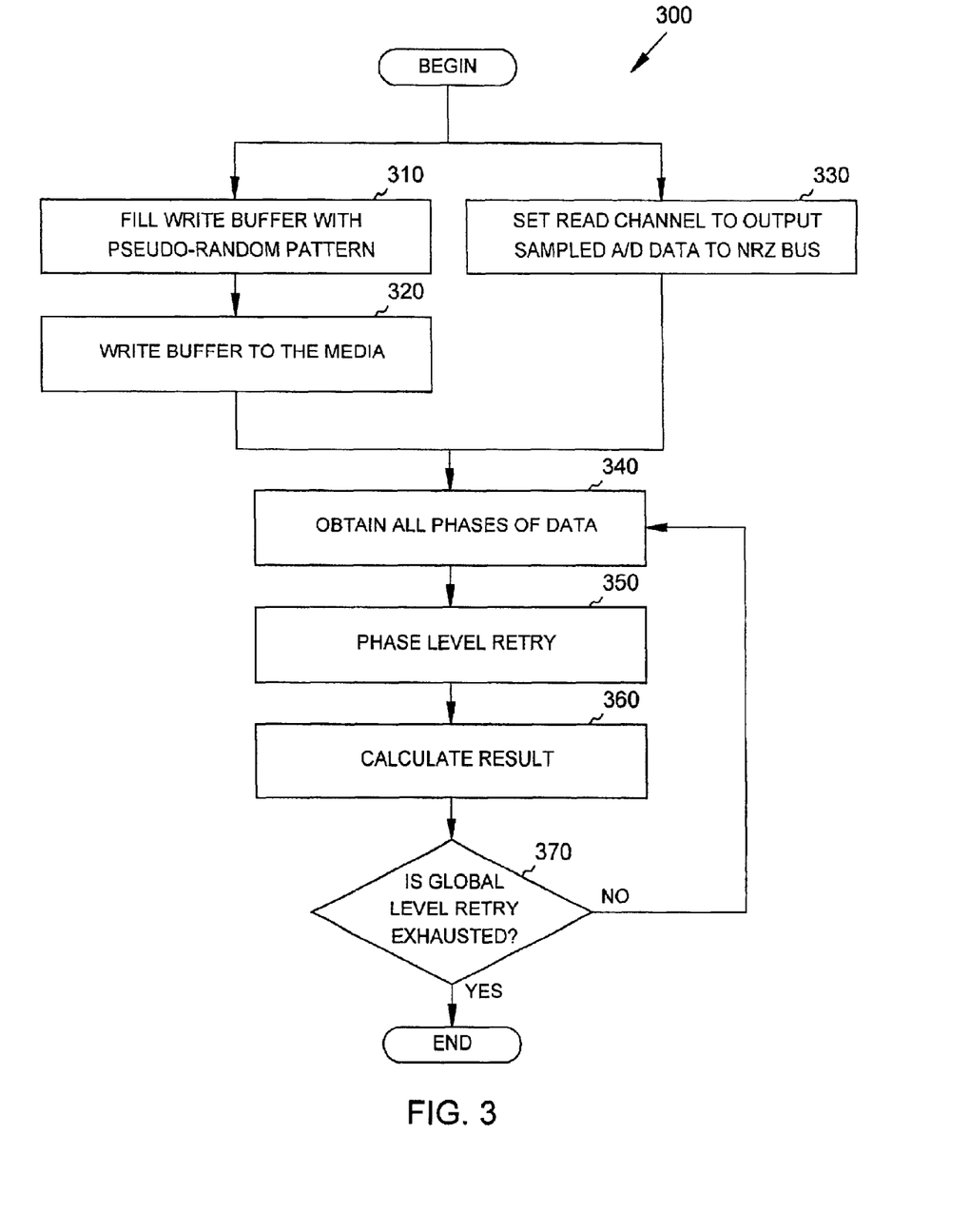
FIG. 3 is a flowchart of a method to determine the time domain equalized signal-to-noise ratio of a mass storage device, according to an embodiment of the invention.

FIG. 3 is a flowchart of a method 300 to determine the time domain equalized signal-to-noise ratio of a mass storage device, according to an embodiment of the invention. In one embodiment, ESNR determining includes both phase level retry and global level retry. Method 300 includes retrying verification of data at the phase level in block 350 and retrying a time domain equalized signal-to-noise ratio at the global level in block 370.

In some embodiments, before the phase level retry in block 350 and the global level retry in block 370, method 300 also includes filling a write buffer of the mass storage device with data in block 310. In some embodiments, the data includes a pseudo-random pattern, in which method 300 later includes writing the write buffer to the media of the mass storage device in block 320. In some embodiments, method 300 also includes setting a read channel to output sampled analog-to-digital converted data to a NRZ bus of the mass storage device in block 330. In varying embodiments, setting the read channel is block 330 is performed before, during, and/or after the filling 310 and the writing 320.

In some embodiments, thereafter, method 300 includes obtaining all phases of data stored on the media in block 340, before the phase level retry in block 350 and the global level retry in block 370. In one example, the obtaining is reading data, yielding read data. In some embodiments, method 300 also includes calculating a result in block 360.

The actions of the phase level retry in block 350 and the global level retry in block 370 improves the accuracy of the determination of ESNR.

Figure 4:
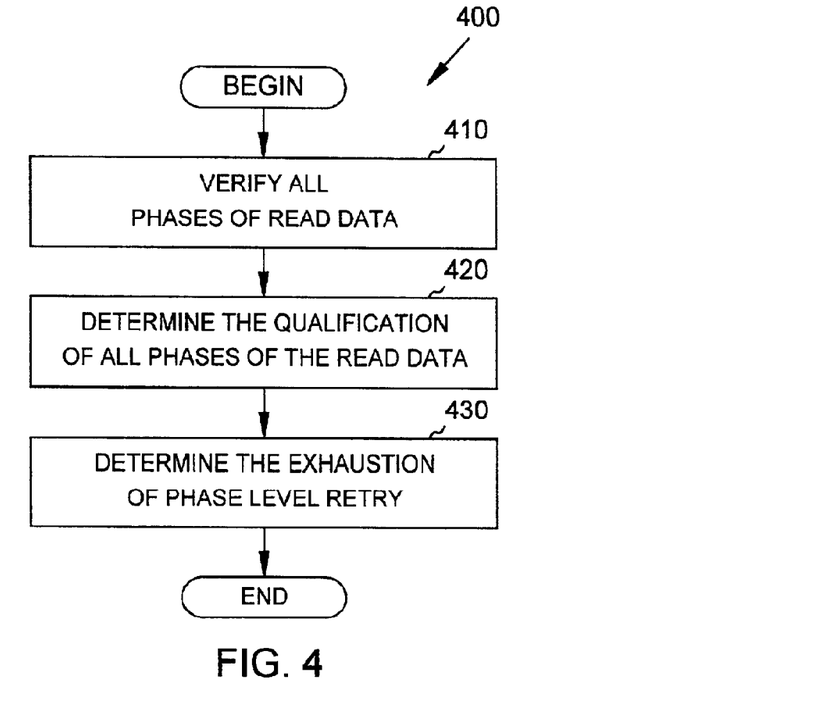
FIG. 4 is a flowchart of a method of phase-level retry of a mass storage device, according to an embodiment of the invention.

FIG. 4 is a flowchart of a method 400 of phase-level retry 350 in FIG. 3 of a mass storage device, according to an embodiment of the invention. Method 400 includes verifying all phases of the read data in block 410. In some embodiments, the verifying in block 410 is substantially similar to the verifying in block 230 in FIG. 2. Method 400 also includes determining the qualification of all phases of the read data in block 420. In some embodiments, the determining in block 420 is substantially similar to the determining in block 235 in FIG. 2. Method 400 also includes determining the exhaustion of phase level retry in block 430. In some embodiments, the determining in block 430 is substantially similar to the determining in block 240.

Figure 5:
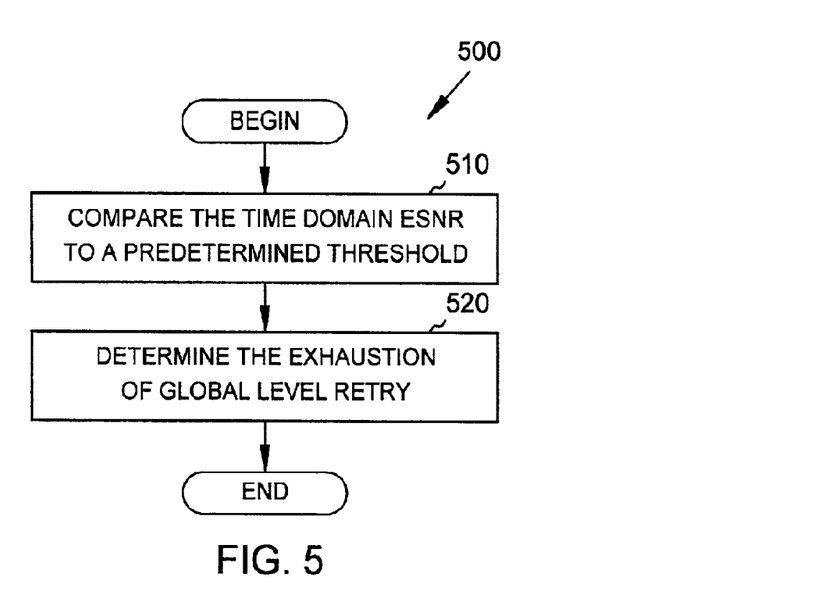
FIG. 5 is a flowchart of a method of global-level retry of a mass storage device, according to an embodiment of the invention.

FIG. 5 is a flowchart of a method 500 of global-level retry 370 in FIG. 3 of a mass storage device, according to an embodiment of the invention. Method 500 includes comparing the time domain equalized signal-to-noise ratio to a predetermined threshold in block 510. In some embodiments, the comparing in block 510 is substantially similar to the comparing in block 255 in FIG. 2. Method 500 also includes determining the exhaustion of global level retry in block 520. In some embodiments, the determining in block 520 is substantially similar to the determining in block 260 in FIG. 2.

Figure 6:
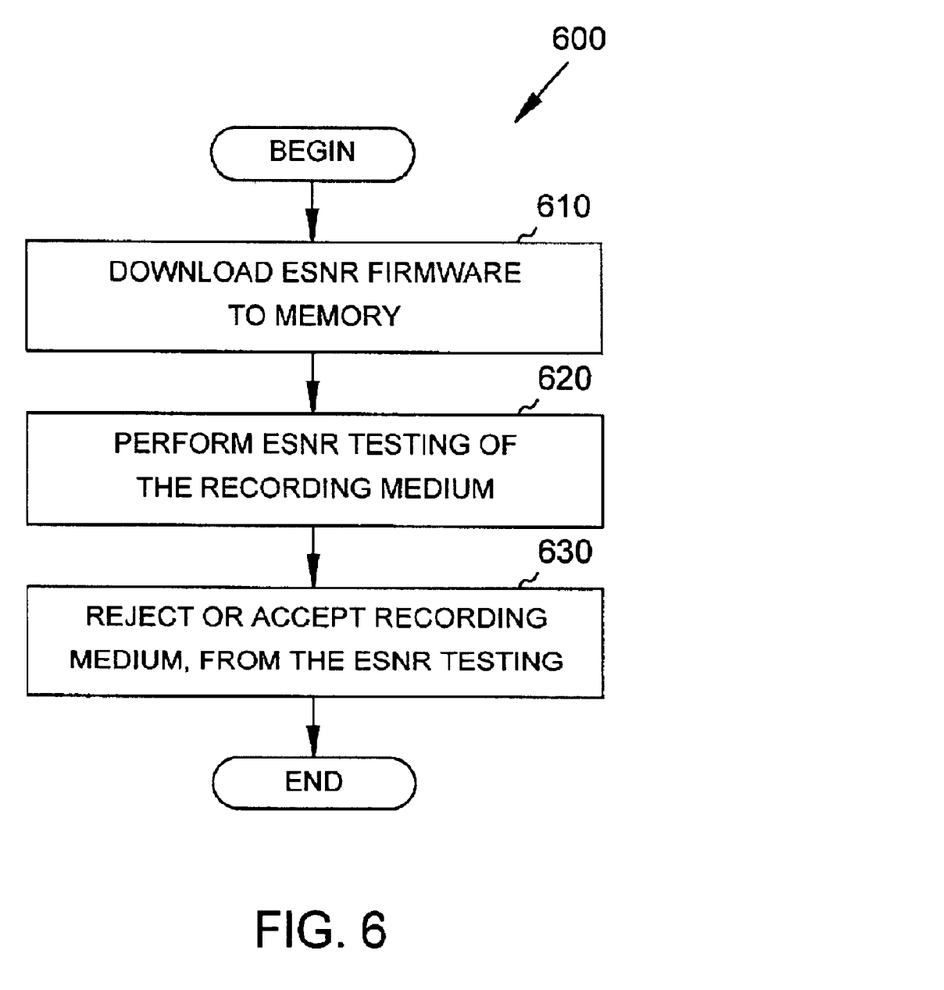
FIG. 6 is a flowchart of a method of performing a quality assurance test of a mass storage device, according to an embodiment of the invention.

FIG. 6 is a flowchart of a method 600 of performing a quality assurance test of a mass storage device, according to an embodiment of the invention. Method 600 includes downloading ESNR firmware to a memory of the mass storage device to the recording medium of the mass storage device in block 610. The ESNR firmware is performed to test the quality of the recording medium of the mass storage in block 620. In some embodiments, the mass storage device performs method 200 in FIG. 2. In some embodiments, the mass storage device performs method 300 in FIG. 3.

Thereafter, a decision of rejecting or accepting the test device is performed, in reference to the ESNR value, in block 630. The ESNR value assists in determining the reliability of the mass storage device.

Figure 13:
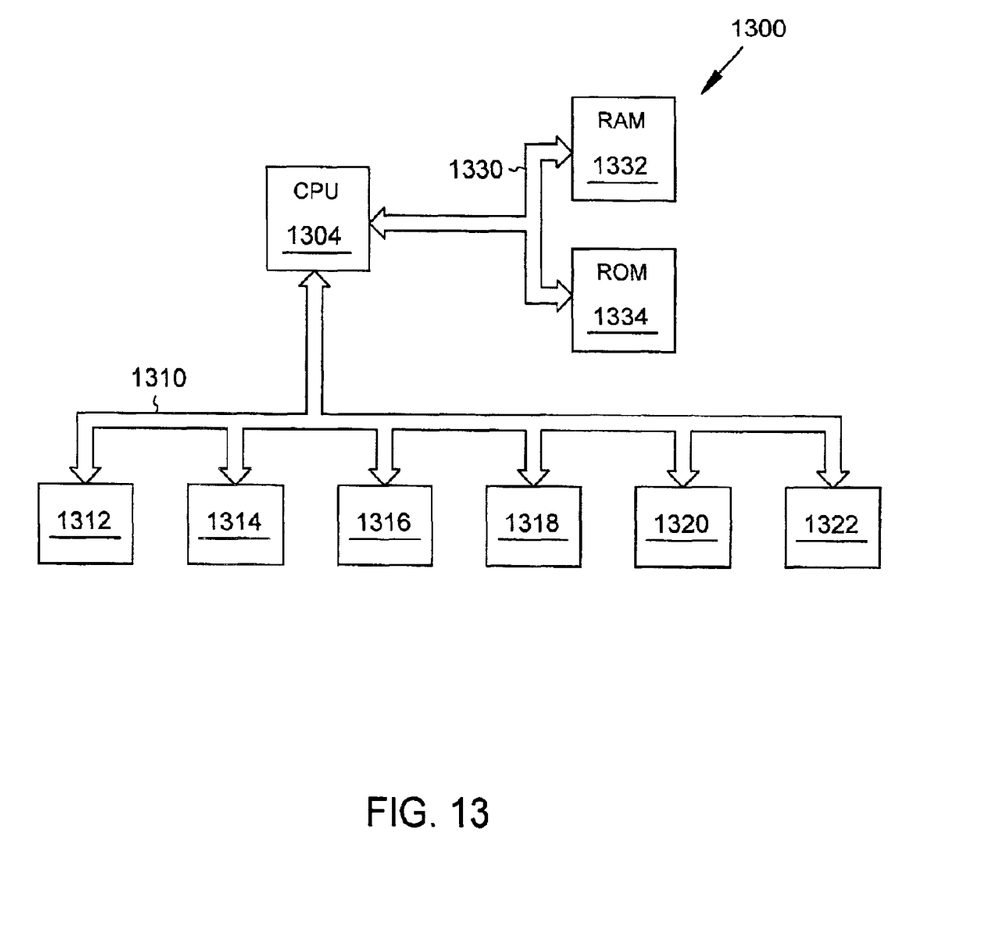
FIG. 13 is a schematic view of a computer system.

In another embodiment, methods 200–600 are implemented as a computer-accessible medium having executable instructions capable of directing a central processing unit, such as central processing unit 1304 in FIG. 13, to perform the respective method. In varying embodiments, the medium is a magnetic medium, an electronic medium, or an optical medium.

Figure 7:
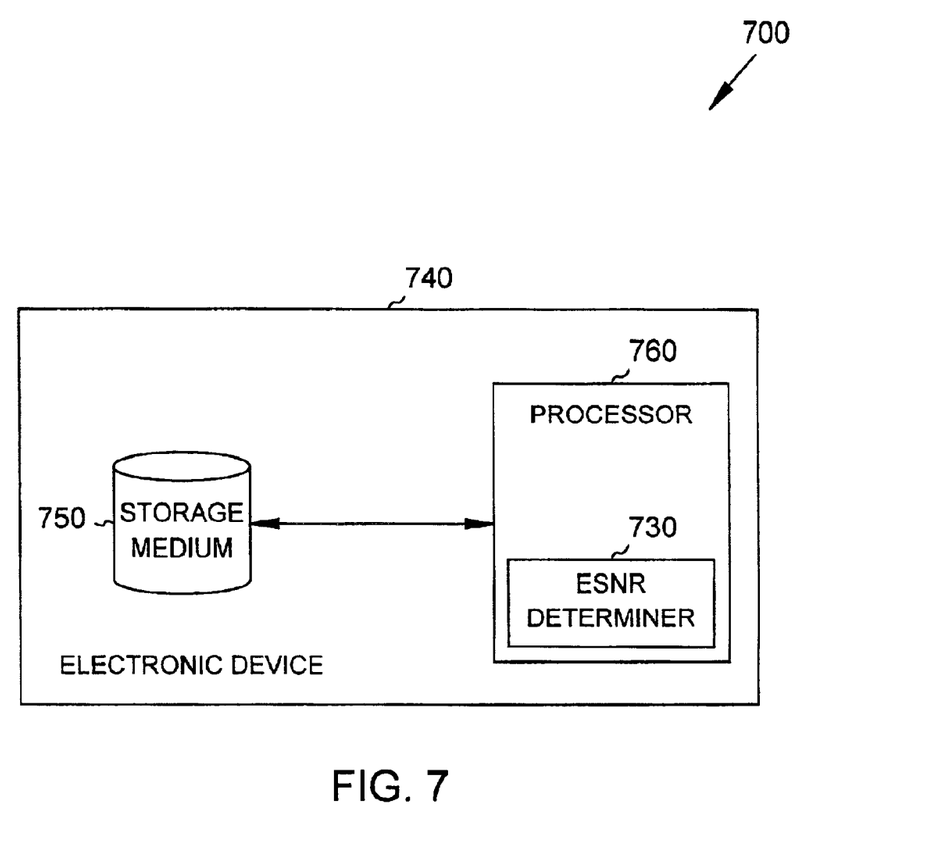
FIG. 7 is a block diagram of an apparatus to perform a manufacturing quality assurance pass/fail test on an electronic device, according to an embodiment of the invention.

FIG. 7 is a block diagram of an apparatus 700 to perform a manufacturing quality assurance pass/fail test on an electronic device, according to an embodiment of the invention. In some embodiments, the electronic device 710 is substantially similar to system 100.

Apparatus 700 includes an electronic device 740 that includes, or is associated with, a processor 760 having production firmware. In some embodiments, the electronic device 740 is a mass storage device. In some embodiments, the mass storage is a disc drive. Production firmware is firmware that is produced for testing or production use in the electronic device 740. The production firmware is stored in memory, such as random-access memory (RAM) or read-only-memory (ROM). Some embodiments of ROM are electrically erasable programmable read-only memory (EEPROM) and flash erasable programmable read-only memory (FLASH). The production firmware includes a determiner 730 of a time domain equalized signal-to-noise ratio. The determiner 730 is operative on the processor 760 to determine the ESNR of a recording medium 750.

The present invention provides the ESNR determiner 730 in an electronic device 740 that is stored in the firmware. Apparatus 700 eliminates the need of an ESNR determining means on another electronic device. Storing the ESNR determining means 730 in the electronic device 740 improves the speed of the determination of the ESNR.

Figure 8:
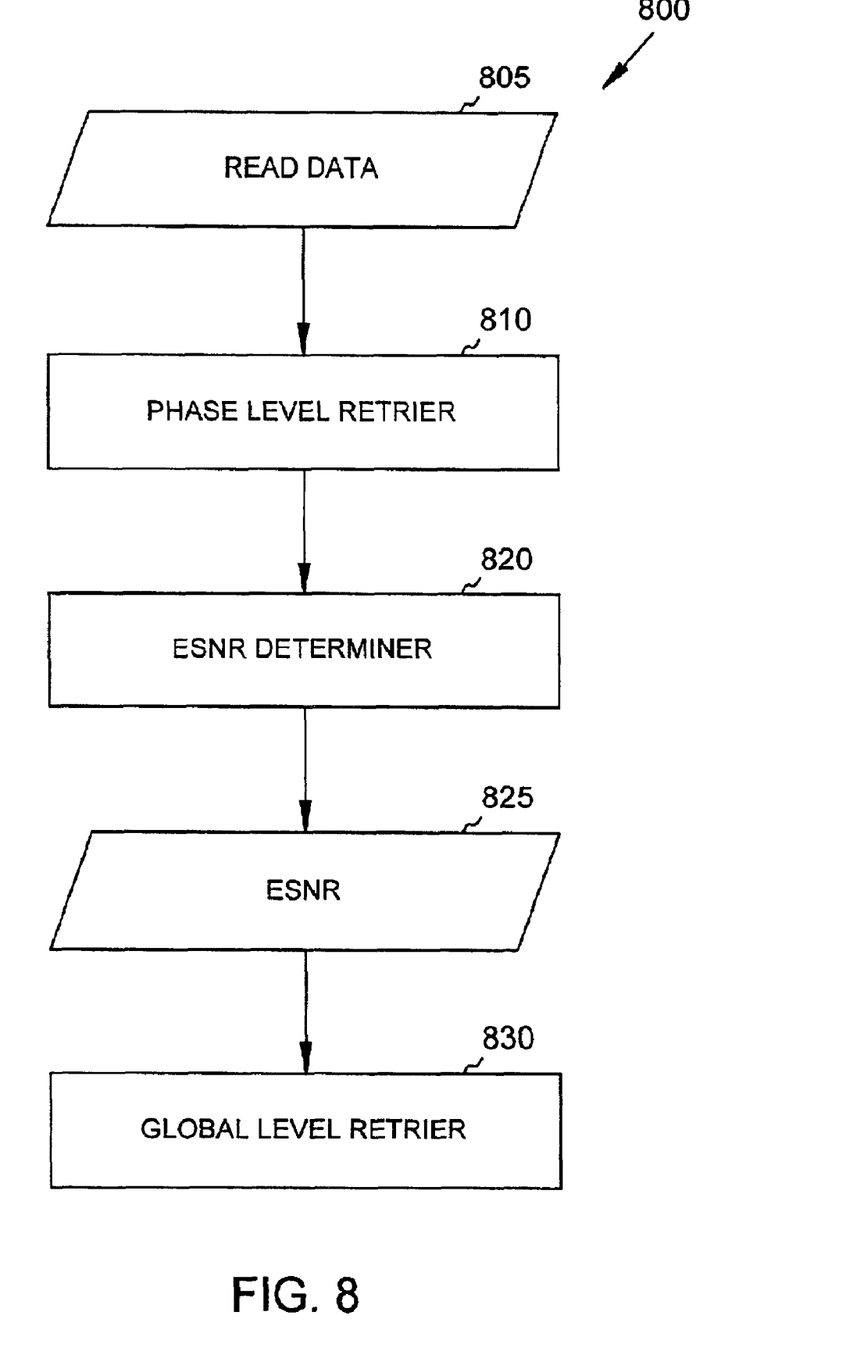
FIG. 8 is a block diagram of a determiner of a time domain equalized signal-to-noise ratio, according to an embodiment of the invention.

FIG. 8 is a block diagram of a determiner 800 of a time domain equalized signal-to-noise ratio, according to an embodiment of the invention. Apparatus 800 includes a phase level retrier 810. The phase level retrier 810 verifies that all phases are verified and qualified of read data 805 within a certain quantity of attempts. In varying embodiments, the phase level retrier 810 performs retrying verification of data at the phase level 350 in FIG. 3, and/or method 400.

An ESNR determiner 820 is operably coupled to the phase level retrier 810. In varying embodiments, the ESNR determiner 820 calculates a time domain equalized signal-to-noise ratio 825 from read data 805 in FIG. 2, and/or calculating a result 360 in FIG. 3.

A global level retrier 830 is operably coupled to the ESNR determiner 820. The global level retrier 830 verifies an acceptable ESNR within a certain quantity of read attempts. In varying embodiments, the global level retrier performs retrying a time domain equalized signal-to-noise ratio at the global level 370 in FIG. 3, and/or method 500 in FIG. 5.

Figure 9:
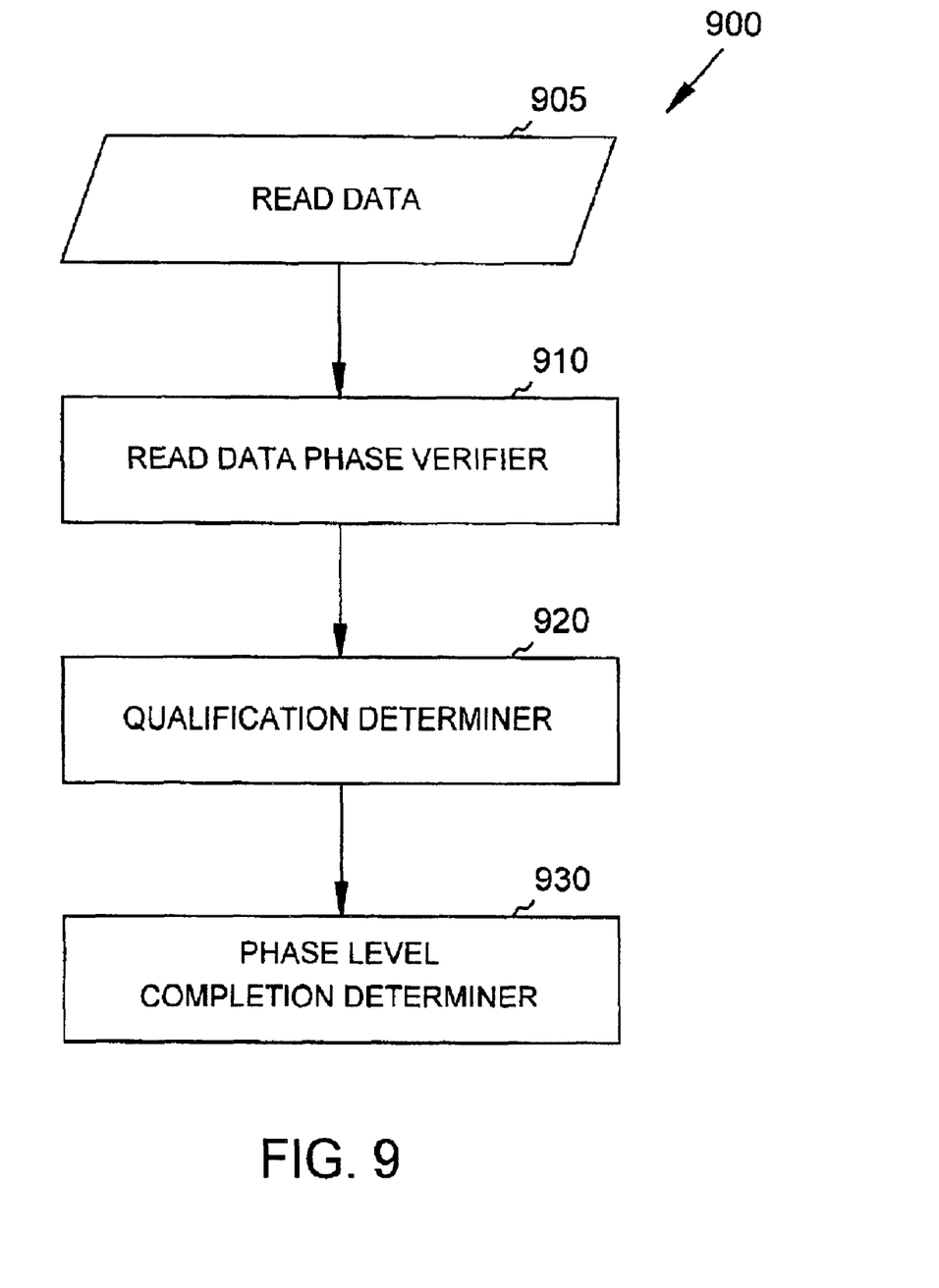
FIG. 9 is a block diagram of a phase level retrier, according to an embodiment of the invention.

FIG. 9 is a block diagram of a phase level retrier 900, according to an embodiment of the invention. The phase level retrier 900 verifies that all phases of read data 905 are verified and qualified within a certain quantity of attempts. In varying embodiments, the phase level retrier 900 performs retrying verification of data at the phase level 350 in FIG. 3, and/or method 400.

The phase level retrier includes a read data phase verifier 910. In varying embodiments, the read data phase verifier 910 performs the function of checking and/or verifying 230 in FIG. 2 each of the plurality of phases of the read data 905, and/or verifying all phases of the read data 410 in FIG. 4.

A qualification determiner 920 is operably coupled to the read data phase verifier 910. In varying embodiments, the qualification determiner 920 performs determination as to whether all phases are qualified 235 in FIG. 2, and/or determining the qualification of all phases of the read data 420 in FIG. 4.

A phase level completion determiner 930 is operably coupled to the qualification determiner 920. In varying embodiments, the phase level completion determiner 930 performs the determination is made as to whether the number of phase level retries has been exhausted 240 in FIG. 2, and/or determining the exhaustion of phase level retry 430 in FIG. 4.

Figure 10:
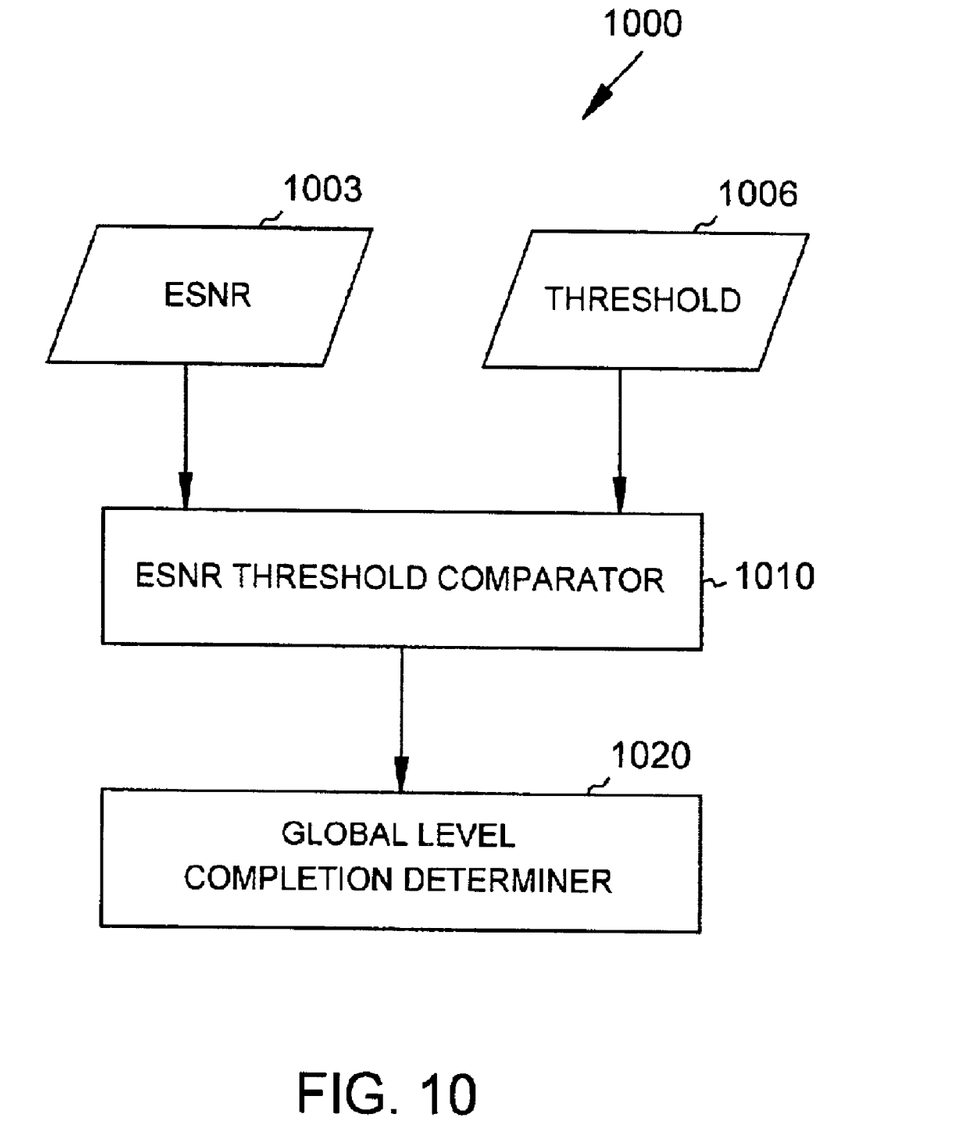
FIG. 10 is a block diagram of a global level retrier, according to an embodiment of the invention.

FIG. 10 is a block diagram of a global level retrier 1000, according to an embodiment of the invention. The global level retrier 1000 verifies an acceptable ESNR 903 within a certain quantity of read attempts. In varying embodiments, the global level retrier performs retrying a time domain equalized signal-to-noise ratio at the global level 370 in FIG. 3, and/or method 500 in FIG. 5.

The global level retrier 1000 includes an ESNR threshold comparator 1010. In varying embodiments, the global level retrier 1000 performs comparing 255 in FIG. 2 a calculated ESNR value 903 to a predetermined threshold 906 and/or comparing 510 in FIG. 5 the time domain equalized signal-to-noise ratio 903 to a predetermined threshold 906.

A global level completion determiner 1020 is operably coupled to the ESNR threshold comparator 1020. In varying embodiments, the global level completion determiner 1020 performs determining if global retries has been exhausted 260 in FIG. 2 and/or determining the exhaustion of global level retry 520 in FIG. 5.

The components of apparatus 700, 800, 900, and 1000 can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as C or assembly language. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

FIG. 11 is an exploded view of one embodiment of a disc drive of the present invention, this embodiment showing one type of magnetic disc drive 1100 having a rotary actuator. The disc drive 1100 is one example of mass storage devices, such as compact disc (CDROM) devices, tape cartridge devices, digital versatile disc (DVD) or digital video disc (DVD) devices. Other embodiments include other configurations and data recording and/or reading technologies. The disc drive 1100 includes a housing or base 1112, and a cover 1114. The base 1112 and cover 1114 form a disc enclosure. Rotatably attached to the base 1112 on an actuator shaft 1118 is an actuator assembly 1120. The actuator assembly 1120 includes a comb-like structure 1122 having a plurality of arms 1123. Attached to the separate arms 1123 on the comb 1122, are load beams or load springs 1124. Load beams or load springs are also referred to as suspensions. Attached at the end of each load spring 1124 is a slider 1126, which carries a magnetic transducer 1150. In some embodiments, transducer 1150 includes an electromagnetic coil write head and a magneto-resistive read head. The slider 1126 with the transducer 1150 form what is often called the head. It should be noted that many sliders have one transducer 1150 and that is what is shown in the figures. It should also be noted that this invention is equally applicable to sliders having more than one transducer, such as what is referred to as an MR or magneto resistive head in which one transducer 1150 is generally used for reading and another is generally used for writing. On the end of the actuator assembly 1120 opposite the load springs 1124 and the sliders 1126 is a voice coil 1128.

Attached within the base 1112 is a first magnet 1130 and a second magnet 1131. As shown in FIG. 11, the second magnet 1131 is associated with the cover 1114. The first and second magnets 1130, 1131, and the voice coil 1128 are the key components of a voice coil motor that applies a force to the actuator assembly 1120 to rotate it about the actuator shaft 1118. Also mounted to the base 1112 is a spindle motor. The spindle motor includes a rotating portion called a spindle hub 1133. In this particular disc drive, the spindle motor is within hub 1133. In FIG. 11, a number of discs 1134 (one or more; four are shown) are attached to the spindle hub 1133 to form disc assembly 1132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors that are within the hub 1133 or under the hub.

Figure 12:
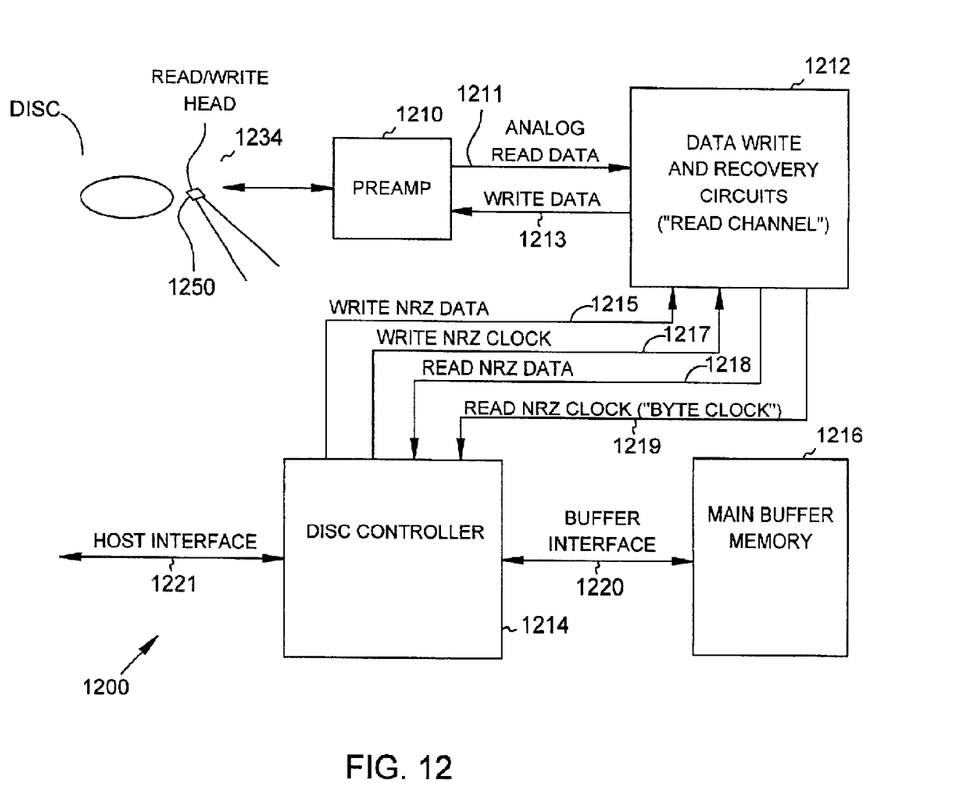
FIG. 12 is a high-level block diagram showing the main data paths in a conventional high-level disc drive architecture.

FIG. 12 is a high-level block diagram showing the main data paths in a conventional high-level disc drive architecture 1200 for a typical disc drive system 1100. Only the main data paths between the host interface 1221 and the disc media 1134 are shown, and only the system's main components relevant to the invention are depicted.

One disc 1134 is shown, having transducer (read/write head) 1150 transferring data between the disc surface 1150 and pre-amplifier (preamp) 1210. Write data 1213 is transferred from circuit 1212 to preamp 1210 for write operations, based on write NRZ (non-return-to-zero) data 1215 and NRZ clock 1217. Analog read data is transferred from preamp 1210 to the recovery circuits of read channel 1212, which provides NRZ read data 1218 and NRZ read clock 1219 (also called the "byte clock") to disc controller 1214. Data is transferred to and from main buffer memory 1216 of the disc drive across buffer interface 1220.

The read channel circuitry 1212 provides a byte clock 1219 to the disc controller 1214, matching the disc data rate both during read and write events and during idle periods when no data is being transferred to or from the media.

Disc controller 1214 is the heart of the disc drive from a data transfer management perspective. During disc reads, for example, it controls read channel 1212 to locate the appropriate physical position of the data on the media and to transfer the data into disc controller 1214, through data pipelines and FIFOs, and into main buffer memory 1216. Disc controller 1214 also typically includes logic to transfer the data from main buffer memory 1216, through data pipelines and FIFOs, and across host interface 1221. The subsystem within disc controller 1214 that is responsible for controlling the data traffic into and out of main buffer memory 1216 is referred to as the buffer controller.

Also, disc controller 1214 typically includes ECC encoder and decoder logic to protect the integrity of the data stored on the disc media and to correct relatively small errors in the data which result from imperfect disc media and from an imperfect read channel 1212. This error correction function within the disc controller 1214 typically requires functional support and bandwidth from the buffer controller to access main buffer memory 1216.

FIG. 13 is a schematic view of a computer system 1300. Advantageously, the invention is well-suited for use in a computer system 1300. The computer system 1300 may also be called an electronic system or an information handling system and includes a central processing unit, a memory and a system bus. The information handling system includes a central processing unit 1304, a random access memory 1332, and a system bus 1330 for communicatively coupling the central processing unit 1304 and the random access memory 1332. The computer system 1300 includes a disc drive device. The computer system 1300 may also include an input/output bus 1310 and several peripheral devices, such as 1312, 1314, 1316, 1318, 1320, and 1322, which may be attached to the input output bus 1310. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, systems and methods are disclosed through which a time domain equalized signal-to-noise-ratio (ESNR) of an electronic device is determined by a device 110 other than the microcontroller of the electronic device. In one aspect of the present invention, ESNR determining logic 130 is implemented in an electronic device that is operably coupled to a storage medium of the device for the purpose of performing rejection/acceptance testing of the electronic device during manufacturing of the device, and/or the purpose of performing read channel tuning and optimization.

In one embodiment, determining the ESNR includes both phase level retry and global level retry. Method 300 includes retrying verification of data at the phase level 350 and retrying 370 a time domain equalized signal-to-noise ratio at the global level.

In some embodiments, before the phase level retry 350 and the global level retry 370, method 300 also includes filling 310 a write buffer of the mass storage device with data, the data having a pseudo-random pattern, and later writing 320 the write buffer to the media of the mass storage device. In some embodiments, the mass storage device includes a disc drive. In some embodiments, method 300 also includes setting 330 a read channel to output sampled analog-to-digital converted data to a NRZ bus of the mass storage device. In varying embodiments, setting the read channel 330 is performed before, during, and/or after the filling 310 and the writing 320, such as filling 310 performed after setting 330. In some embodiments of method 300, filling 310, setting 330, writing 320, and reading 340 are performed before retrying 350. In some embodiments, thereafter, method 300 includes obtaining 340 all phases of data stored on the media, before the phase level retry 350 and the global level retry 370. In one example, the obtaining is reading data, yielding read data. In some embodiments, method 300 also includes calculating a result 360. In some further embodiments, the calculating 360 is performed after the phase level retrying and before the global level retrying 370. In some embodiments, method 300 also includes determining that the mass storage device passed or failed.

The actions of the phase level retry 350 and the global level retry 370 improves the accuracy of the determination of ESNR.

One embodiment of phase level retrying 350 includes verifying 410 all phases of the read data, determining 420 the qualification of all phases of the read data, and determining 430 the exhaustion of phase level retry.

One embodiment of global level retrying includes comparing 510 the time domain equalized signal-to-noise ratio to a predetermined threshold, and determining 520 the exhaustion of global level retry.

Performing a quality assurance test of a mass storage device 600 includes downloading ESNR test firmware to a memory of the mass storage device 610, determining 620 an ESNR value of a recording medium of the mass storage device, rejecting or accepting 630 the test device, from the ESNR value.

An electronic device 740 includes a test microcontroller or microprocessor 760 having firmware. The firmware has a determiner 730 of a time domain equalized signal-to-noise ratio. The processor 760 is operably coupled to a storage medium 750 of the electronic device 740.

A determiner 800 of a time domain equalized signal-to-noise ratio includes a phase level retrier 810, an ESNR determiner 820, and a global level retrier. A phase level retrier 900 includes a read data phase verifier 910, a qualification determiner 920, and a phase level completion determiner 930. A global level retrier 1000 includes an ESNR threshold comparator 1010, a global level completion determiner 1020.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

We claim:

1. A method to determine a time domain equalized signal-to-noise ratio of a data storage device, the method comprising the steps of:

reading data having a pseudo-random pattern from the data storage device to obtain read data; and calculating a time domain equalized signal-to-noise ratio from the read data.

2. The method of claim 1, wherein the data storage device further comprises a disc drive.

3. A method to determine a time domain equalized signal-to-noise ratio of a data storage device, the method comprising the steps of:

filling a write buffer with data, the data having a pseudo-random pattern;

writing the write buffer to a media of the data storage device;

reading all phases of the data stored on the media, yielding read data;

verifying the read data at a phase level; and calculating a time domain equalized signal-to-noise ratio at a global level.

4. The method of claim 3, wherein the verifying step further comprises the steps of:

verifying all phases of the read data;

determining a qualification of all phases of the read data; and determining exhaustion of phase level retry.

5. The method of claim 3, wherein the calculating step further comprises the steps of:

comparing the time domain equalized signal-to-noise ratio to a predetermined threshold; and determining the exhaustion of global level retry.

6. The method of claim 3, wherein the method further comprises the step of:

calculating a time domain equalized signal-to-noise ratio from the read data.

7. The method of claim 3, wherein the method further comprises the step of:

determining that the data storage device passed or failed.

8. A data storage device tester comprising:

a data storage medium; and a controller, operably coupled to the data storage medium, the controller operably programmed to:
read data having a pseudo-random pattern from the storage medium to obtain read data; and
calculate a time domain equalized signal-to-noise ratio from the read data.

9. The data storage device tester of claim 8, wherein the controller is further programmed to:

verify all phases of the read data;

determine a qualification of all phases of the read data; and determine exhaustion of phase level retry.

10. The data storage device tester of claim 9, wherein the controller is further programmed to:

compare the time domain equalized signal-to-noise ratio to a predetermined threshold; and determine the exhaustion of global level retry.

11. The data storage device tester of claim 8, wherein the data storage medium further comprises a magnetic disc drive.

12. The data storage device tester of claim 8, wherein the data storage medium further comprises an optical disc drive.

13. An apparatus configured to perform the method of claim 1.

* * * * *